(12) United States Patent
Bi et al.

(10) Patent No.: US 11,988,761 B2
(45) Date of Patent: May 21, 2024

(54) INFORMATION TRANSMISSION METHOD AND DEVICE, NODE AND SERVER

(71) Applicant: ZTE CORPORATION, Guangdong (CN)

(72) Inventors: Cheng Bi, Guangdong (CN); Shijun Chen, Guangdong (CN); Chuangxin Jiang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 315 days.

(21) Appl. No.: 17/605,292

(22) PCT Filed: Apr. 9, 2020

(86) PCT No.: PCT/CN2020/083861
§ 371 (c)(1),
(2) Date: Oct. 21, 2021

(87) PCT Pub. No.: WO2020/220959
PCT Pub. Date: Nov. 5, 2020

(65) Prior Publication Data
US 2022/0229144 A1    Jul. 21, 2022

(30) Foreign Application Priority Data
Apr. 29, 2019   (CN) .......................... 201910356081.1

(51) Int. Cl.
*H04W 24/10* (2009.01)
*G01S 5/00* (2006.01)
*H04L 5/00* (2006.01)

(52) U.S. Cl.
CPC .......... *G01S 5/0063* (2013.01); *H04L 5/0051* (2013.01); *H04W 24/10* (2013.01)

(58) Field of Classification Search
CPC .............................. G01S 5/0063; H04W 24/10
See application file for complete search history.

(56) References Cited

U.S. PATENT DOCUMENTS 9,736,629 B2 * 8/2017 Woo ...................... H04W 64/00
10,212,688 B2   2/2019 Xiao et al.
(Continued)

FOREIGN PATENT DOCUMENTS

CN    103209475 A    7/2013
CN    106341882 A    1/2017
(Continued)

OTHER PUBLICATIONS

European Patent Office, EP20799248.8 Extended European Search Report dated Nov. 30, 2022.
(Continued)

*Primary Examiner* — Barry W Taylor
(74) *Attorney, Agent, or Firm* — Li & Cai Intellectual Property (USA) Office

(57) ABSTRACT

The present disclosure provides an information transmission method and device, a node, a server and a computer-readable storage medium. The method includes: determining, by a transmitting node, a reference signal for positioning and transmitting configuration information of the reference signal for positioning to a positioning server, with the reference signal for positioning at least including a Positioning Reference Signal (PRS); and transmitting, by the transmitting node, the reference signal according to the configuration information.

15 Claims, 8 Drawing Sheets

(56) References Cited

U.S. PATENT DOCUMENTS

| | | | |
|---|---|---|---|
| 2016/0080106 A1 | 3/2016 | Srinivasan et al. | |
| 2016/0119095 A1 | 4/2016 | Lee et al. | |
| 2019/0327707 A1* | 10/2019 | Agnihotri | G01S 5/0236 |
| 2022/0163614 A1* | 5/2022 | Wong | H04W 64/00 |
| 2022/0191830 A1* | 6/2022 | Khoryaev | H04L 27/261 |
| 2023/0269048 A1* | 8/2023 | Kumar | H04W 64/00 370/329 |

FOREIGN PATENT DOCUMENTS

| | | |
|---|---|---|
| CN | 109565780 A | 4/2019 |
| CN | 109644423 A | 4/2019 |
| WO | WO 2011115546 A1 | 9/2011 |
| WO | WO 2011129734 A1 | 10/2011 |

OTHER PUBLICATIONS

Sony, "Considerations on Downlink based Positioning in NR", 3GPP Draft, Jan. 20, 2019.
Intel Corporation, "Downlink and Uplink Reference Signals for NR Positioning", 3GPP Draft, Apr. 3, 2019.
China Patent Office, CN201910356081.1 First Office Action dated Apr. 27, 2022.
CATT, "DL and UL Reference Signals for NR Positioning", 3GPP TSG RAN WG1 #96bis, Apr. 3, 2019.
WIPO, International Search Report dated Jun. 3, 2020.
CATT. "DL and UL Reference Signals for NR Positioning," 3GPP TSG RAN WG1 #96bis, Xi'an, China, Apr. 3, 2019.
Intel Corporation. "Offline Discussion Outcome on DL Reference Signals for NR Positioning," 3GPP TSG RAN WG1 Meeting #96bis, Xi'an, China, Apr. 15, 2019.

* cited by examiner

INFORMATION TRANSMISSION METHOD AND DEVICE, NODE AND SERVER

CROSS-REFERENCE TO RELATED APPLICATIONS

This is a National Phase Application filed under 35 U.S.C. 371 as a national stage of PCT/CN2020/083861, filed on Apr. 9, 2020, an application claiming the priority of Chinese Patent Application No. 201910356081.1, filed on Apr. 29, 2019, the contents of which are incorportated herein in their entirety by reference.

TECHNICAL FIELD

The present disclosure relates to, but is not limited to, an information transmission method and device, a node, a server and a computer-readable storage medium.

BACKGROUND

Positioning has always been an important requirement from various industries, and satellite positioning can provide a positioning result with certain accuracy in an outdoor scene, but cannot meet positioning requirements in a blocked scene or an indoor scene.

Reference signals play an important role in a Long Term Evolution (LTE) system, and the LTE supports a Cell Reference Signal (CRS), a Multicast-Broadcast Single-Frequency Network (MBSFN) Reference Signal, a Demodulation Reference Signal (DMRS), a Channel State Information Reference Signal (CSI-RS) and a Positioning Reference Signal (PRS) used for downlink positioning.

No relevant standards for specific use of the reference signals in positioning have been proposed in the study stage of 5G.

SUMMARY

A summary is given below for the subject matter to be described in detail herein, but the summary is not intended to limit the protection scope of the claims.

Embodiments of the present disclosure provide an information transmission method and device, a node, a server and a computer-readable storage medium, so as to reasonably use a reference signal for positioning.

An embodiment of the present disclosure provides an information transmission method, including: determining, by a transmitting node, a reference signal for positioning and transmitting configuration information of the reference signal for positioning to a positioning server, with the reference signal for positioning at least including a PRS; and transmitting, by the transmitting node, the reference signal according to the configuration information.

An embodiment of the present disclosure further provides an information transmission method, including: receiving, by a positioning server, configuration information of a reference signal for positioning transmitted by a transmitting node; and transmitting, by the positioning server, the configuration information to a receiving node, so as to allow the receiving node to receive the reference signal for positioning according to the configuration information. The reference signal for positioning at least includes a PRS.

An embodiment of the present disclosure further provides an information transmission method, including: receiving, by a receiving node, configuration information of a reference signal for positioning transmitted by a positioning server; receiving, by the receiving node, the reference signal for positioning transmitted by a transmitting node according to the configuration information; and performing, by the receiving node, positioning measurement according to the reference signal. The reference signal for positioning at least includes a PRS.

An embodiment of the present disclosure further provides an information transmission device, including: a first transmitting module configured to determine a reference signal for positioning and transmit configuration information of the reference signal for positioning to a positioning server, with the reference signal for positioning at least including a PRS; and a second transmitting module configured to transmit the reference signal according to the configuration information.

An embodiment of the present disclosure further provides an information transmission device, including: a first receiving module configured to receive configuration information of a reference signal for positioning transmitted by a transmitting node; and a third transmitting module configured to transmit the configuration information to a receiving node, so as to allow the receiving node to receive the reference signal for positioning according to the configuration information. The reference signal for positioning at least includes a PRS.

An embodiment of the present disclosure further provides an information transmission device, including: a second receiving module configured to receive configuration information of a reference signal for positioning transmitted by a positioning server; a third receiving module configured to receive the reference signal for positioning transmitted by a transmitting node according to the configuration information; and a positioning module configured to perform positioning measurement according to the reference signal. The reference signal for positioning at least includes a PRS.

An embodiment of the present disclosure further provides a transmitting node, including: a memory, a processor and a computer program which is stored in the memory and is executable by the processor. The processor performs the information transmission method of the present disclosure when executing the program.

An embodiment of the present disclosure further provides a positioning server, including: a memory, a processor and a computer program which is stored in the memory and is executable by the processor. The processor performs the information transmission method of the present disclosure when executing the program.

An embodiment of the present disclosure further provides a receiving node, including: a memory, a processor and a computer program which is stored in the memory and is executable by the processor. The processor performs the information transmission method of the present disclosure when executing the program.

An embodiment of the present disclosure further provides a computer-readable storage medium having a computer-executable instruction stored therein. When the computer-executable instruction is executed by a processor, the processor performs the information transmission methods of the present disclosure.

Other aspects may be understood upon reading and understanding the accompanying drawings and detailed description.

DETAILED DESCRIPTION

The embodiments of the present disclosure will be described in detail below with reference to the accompanying drawings.

The steps illustrated in the flowcharts of the drawings may be performed in a computer system such as a set of computer-executable instructions. Although a logical order is illustrated in the flowchart, the steps illustrated or described may be performed in an order different from that described herein in some cases.

Many reference signals are added in the stage of Release 15 of 5G (5G Rel-15) compared to before, some of the added reference signals are similar to the PRS in the LTE, but no PRS has been defined in the stage of Release 15 of 5G. In a current standard progress, to define a New Radio (NR) new PRS and to reuse some other NR reference signals have their own advantages and disadvantages. However, it is difficult to ensure a positioning effect without incurring unnecessary resource overhead and affecting original functions of those reference signals. Thus, a proper solution is urgently needed.

In the LTE, muting is a mechanism for the PRS to reduce interference among cells, but the muting inevitably affects positioning performance and delays of some positioning nodes. To compensate for the effect by using other existing reference signals may be a reasonable solution.

Figure 1:
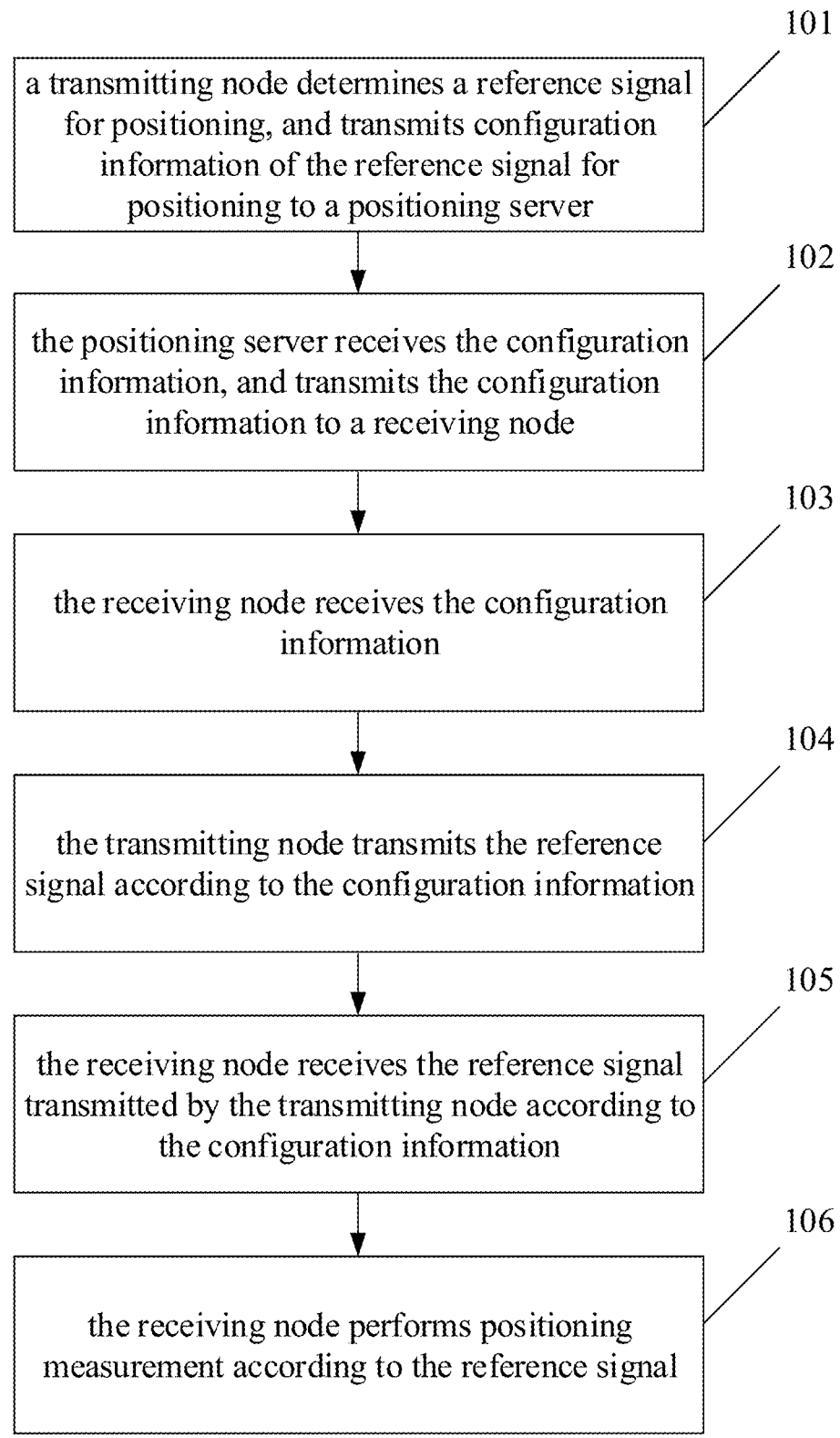
FIG. 1 is a flowchart illustrating an information transmission method according to an embodiment of the present disclosure.

As shown in FIG. 1, an information transmission method according to an embodiment of the present disclosure includes the following steps 101 to 106.

At the step 101, a transmitting node determines a reference signal for positioning, and transmits configuration information of the reference signal for positioning to a positioning server.

The transmitting node may be a base station.

The reference signal for positioning at least includes a PRS.

The configuration information of the reference signal for positioning includes configuration information of the PRS.

The configuration information of the PRS may include a PRS resource selection sequence and a muting sequence of PRS resource collections.

A bit sequence used to indicate actually transmitted PRS resources in a resource collection may be referred to as a PRS resource selection sequence, which is configured to indicate whether a resource block in the resource collection is used to transmit a PRS.

"0" and "1" may be used to indicate whether a PRS resource corresponding to the bit is transmitted. For example, "0" indicates being transmitted while "1" indicates not being transmitted.

The transmitting node does not transmit any other signal in a position of a PRS resource which is selected to be transmitted.

Figure 2:
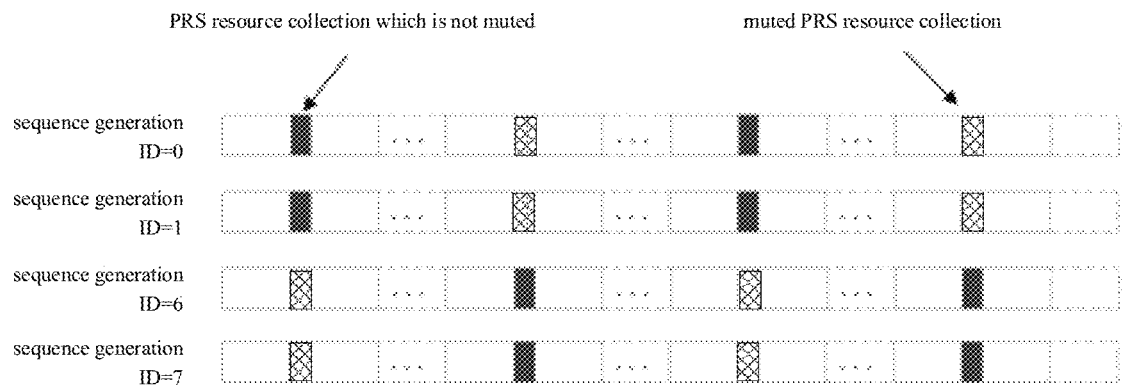
FIG. 2 is a schematic diagram illustrating PRS muting according to an embodiment of the present disclosure.

As shown in FIG. 2, the muting sequence of PRS resource collections is configured to indicate whether a PRS is transmitted in a corresponding PRS period. "0" and "1" may be used to indicate whether a PRS resource collection corresponding to the bit is muted. For example, "0" indicates being muted while "1" indicates not being muted.

"Being muted" refers to that the transmitting node transmits the PRS with zero power.

The transmitting node does not transmit any other signal in a position of a muted time/frequency resource.

The configuration information of the PRS may further include at least one of: a sequence generation identification (ID) of a PRS resource, a time-domain starting point, frequency domain density, and muting configuration information of PRS resource collections.

In an embodiment, an initialized pseudorandom sequence of the PRS is generated by the following formula:

$$c_{init} = 2^{29} \left\lfloor \frac{n_{ID}}{2^{10}} \right\rfloor + 2^{10}((N_{symb}^{slot} n_{s,f}^{\mu} + l) \bmod 2^8 + 1)(2(n_{ID} \bmod 2^{10}) + 1) + n_{ID} \bmod 2^{10}$$

where $n_{ID}$ is a scrambling code ID, $n_{s,f}^{\mu}$ refers to a slot number in a wireless frame, and $N_{symb}^{slot}$ refers to the number of symbols in one slot.

The embodiments of the present disclosure provide two ways of supplementing the PRS by using an existing reference signal which is referred to as a supplementary reference signal. The supplementary reference signal may include an CSI-RS.

Way One

The transmitting node may use a reference signal satisfying a positioning requirement in range of a PRS resource collection except for the PRS as a supplementary reference signal, determine a supplementary reference signal resource occupied by the supplementary reference signal, and transmit configuration information of the supplementary reference signal resource to the positioning server. The configuration information includes the configuration information of the supplementary reference signal resource.

That is to say, if the transmitting node determines that another reference signal in range of a PRS resource collection may be used for downlink positioning measurement, the transmitting node takes the resource of the reference signal as the supplementary reference signal resource and transmits the configuration information of the supplementary reference signal resource to the positioning server.

In the embodiment, the supplementary reference signal resource is periodically present in a muting configuration period and is present in each PRS resource period.

In the embodiment, the supplementary reference signal includes a reference signal having a quasi-colocation relationship with the PRS.

In the embodiment, the configuration information of the supplementary reference signal resource includes the quasi-colocation relationship.

In the embodiment, the configuration information of the supplementary reference signal resource includes the following parameters of the supplementary reference signal: a bandwidth, frequency domain density, a time-domain starting point, time domain density, a period and a resource ID.

In the embodiment, the configuration information of the supplementary reference signal resource may further include a scrambling code ID.

Way Two

In a muting configuration period, the transmitting node may use a reference signal set, which satisfies a positioning requirement and a time difference between which and a muted PRS period is smaller than a preset threshold, as a supplementary reference signal, and transmit configuration information of a supplementary reference signal resource collection to the positioning server. The configuration information includes the configuration information of the supplementary reference signal resource collection.

That is to say, in the muting configuration period, if the transmitting node is configured with another reference signal set which may satisfy the positioning requirement and is close to a muted PRS period, the transmitting node transmits information about the reference signal set to the positioning server as a supplementary reference signal resource collection.

In the embodiment, the supplementary reference signal includes reference signals having a quasi-colocation relationship with the PRS.

In the embodiment, the supplementary reference signal is a periodical signal set and has a period in an integer multiple relation to that of the PRS.

In the embodiment, the configuration information of the supplementary reference signal resource collection includes a supplementary resource indication sequence configured to indicate whether the supplementary reference signal is transmitted in a corresponding period, and a time offset relative to a PRS resource collection.

The combination of the supplementary resource indication sequence and the time offset relative to the PRS resource collection is configured to indicate positions of the supplementary reference signal in one muting configuration period.

In the embodiment, the configuration information of the supplementary reference signal resource collection includes the following parameters of the supplementary reference signal: a bandwidth, a period, frequency domain density, a time-domain starting point, a resource collection ID and a muting sequence of supplementary reference signal.

In the embodiment, the configuration information of the supplementary reference signal resource collection may further include a scrambling code ID.

It should be noted that the supplementary reference signal is used to supplement the PRS in the above two ways, and an initialized pseudorandom sequence of the PRS may also be generated by the following formula:

$$c_{init} = 2^{29}\left\lfloor \frac{n_{ID}}{2^{10}} \right\rfloor + 2^{10}((N_{symb}^{slot}n_{s,f}^{u} + l) \bmod 2^8 + 1)(2(n_{ID} \bmod 2^{10}) + 1) + n_{ID} \bmod 2^{10}$$

where $n_{ID}$ is a scrambling code ID, $n_{s,f}^{\mu}$ refers to a slot number in a wireless frame, and $N_{symb}^{slot}$ refers to the number of symbols in one slot.

At the step 102, the positioning server receives the configuration information, and transmits the configuration information to a receiving node.

The receiving node may be a User Equipment (UE).

In an initial stage of the positioning process, the positioning server may transmit the PRS resource selection sequence, the muting sequence of PRS resource collections and the configuration information of the supplementary reference signal to the receiving node as auxiliary information.

At the step 102, the positioning server may determine a reference cell and a neighboring cell of the receiving node, and transmit both configuration information of a reference signal for positioning in the reference cell and configuration information of a reference signal for positioning in the neighboring cell to the receiving node.

At the step 103, the receiving node receives the configuration information.

The receiving node may determine a time domain position and a frequency domain position of the reference signal for positioning according to the configuration information, so as to receive the corresponding reference signal.

At the step 104, the transmitting node transmits the reference signal according to the configuration information.

The transmitting node transmits the reference signal in the corresponding time domain and frequency domain positions according to the configuration information of the reference signal.

At the step 105, the receiving node receives the reference signal transmitted by the transmitting node according to the configuration information.

The receiving node sets a corresponding detection time window and a corresponding detection period according to the configuration information, to detect the reference signal.

The receiving node determines positions of the PRS resources according to the PRS resource selection sequence, determines positions of muted time/frequency resources according to the muting sequence of PRS resource collections, and detects and receives the PRS in a position of a PRS resource which is not muted.

The receiving node determines the position of the supplementary reference signal according to the configuration information of the supplementary reference signal resource, so as to detect and acquire the supplementary reference signal.

At the step 106, the receiving node performs positioning measurement according to the reference signal.

The receiving node may perform positioning measurement according to the received PRS, or according to the PRS and the supplementary reference signal which are received. In the positioning measurement, Observed Time Difference of Arrival (OTDOA) may be used for positioning.

By using the existing reference signal reasonably, the embodiments of the present disclosure can achieve a balance between the resource overhead and the positioning effect, and enhance the positioning effect.

The nodes are separately described below.

Figure 3:
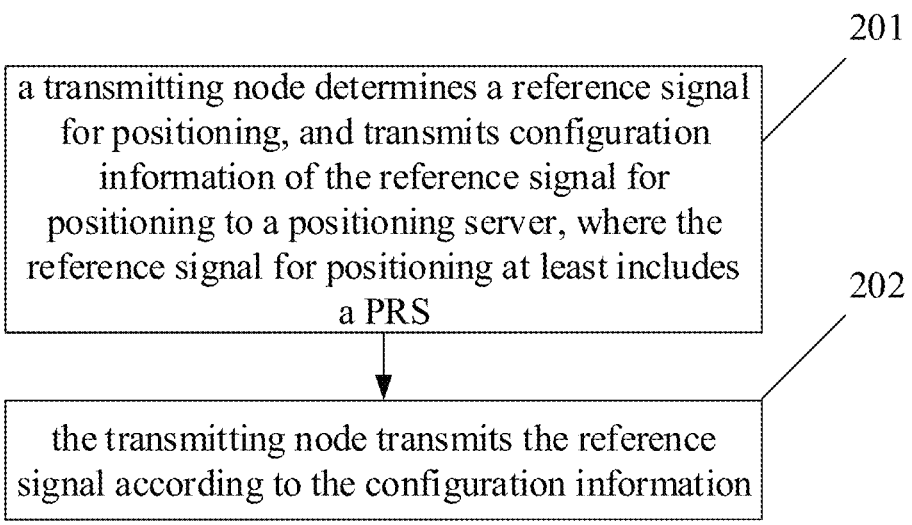
FIG. 3 is a flowchart illustrating an information transmission method applied to a transmitting node according to an embodiment of the present disclosure.

As shown in FIG. 3, according to an embodiment of the present disclosure, an information transmission method applied to a transmitting node includes steps 201 and 202.

At the step 201, a transmitting node determines a reference signal for positioning, and transmits configuration information of the reference signal for positioning to a positioning server. The reference signal for positioning at least includes a PRS.

The transmitting node may be a base station.

The reference signal for positioning at least includes a PRS.

The configuration information of the reference signal for positioning includes configuration information of the PRS.

The configuration information of the PRS may include a PRS resource selection sequence and a muting sequence of PRS resource collections.

A bit sequence used to indicate actually transmitted PRS resources in a resource collection may be referred to as a PRS resource selection sequence, which is configured to indicate whether a resource block in the resource collection is used to transmit a PRS.

"0" and "1" may be used to indicate whether a PRS resource corresponding to the bit is transmitted. For example, "0" indicates being transmitted while "1" indicates not being transmitted.

The transmitting node does not transmit any other signal in a position of a PRS resource which is selected to be transmitted.

The muting sequence of PRS resource collections is configured to indicate whether a PRS is transmitted in a corresponding PRS period. "0" and "1" may be used to indicate whether a PRS resource collection corresponding to the bit is muted. For example, "0" indicates being muted while "1" indicates not being muted.

"Being muted" refers to that the transmitting node transmits the PRS with zero power.

The transmitting node does not transmit any other signal in a position of a muted time/frequency resource.

The configuration information of the PRS may further include at least one of: a sequence generation ID of a PRS resource, a time-domain starting point, frequency domain density, and muting configuration information of PRS resource collections.

In an embodiment, an initialized pseudorandom sequence of the PRS is generated by the following formula:

$$c_{init} = 2^{29} \left\lfloor \frac{n_{ID}}{2^{10}} \right\rfloor + 2^{10}((N_{symb}^{slot} n_{s,f}^{u} + l) \bmod 2^8 + 1)(2(n_{ID} \bmod 2^{10}) + 1) + n_{ID} \bmod 2^{10}$$

where $n_{ID}$ is a scrambling code ID, $n_{s,f}^{\mu}$ refers to a slot number in a wireless frame, and $N_{symbol}^{slot}$ refers to the number of symbols in one slot.

The embodiments of the present disclosure provide two ways of supplementing the PRS by using an existing reference signal which is referred to as a supplementary reference signal. The supplementary reference signal may include an CSI-RS.

Way One

The transmitting node may use a reference signal satisfying a positioning requirement in range of a PRS resource collection except for the PRS as a supplementary reference signal, determine a supplementary reference signal resource occupied by the supplementary reference signal, and transmit configuration information of the supplementary reference signal resource to the positioning server. The configuration information includes the configuration information of the supplementary reference signal resource.

That is to say, if the transmitting node determines that another reference signal in range of a PRS resource collection may be used for downlink positioning measurement, the transmitting node takes the resource of the reference signal as the supplementary reference signal resource and transmits the configuration information of the supplementary reference signal resource to the positioning server.

In the embodiment, the supplementary reference signal resource is periodically present in a muting configuration period and is present in each PRS resource period.

In the embodiment, the supplementary reference signal includes a reference signal having a quasi-colocation relationship with the PRS.

In the embodiment, the configuration information of the supplementary reference signal resource includes the quasi-colocation relationship.

In the embodiment, the configuration information of the supplementary reference signal resource includes the following parameters of the supplementary reference signal: a bandwidth, frequency domain density, a time-domain starting point, time domain density, a period and a resource ID.

In the embodiment, the configuration information of the supplementary reference signal resource may further include a scrambling code ID.

Way Two

In a muting configuration period, the transmitting node may use a reference signal set, which satisfies a positioning requirement and a time difference between which and a muted PRS period is smaller than a preset threshold, as a supplementary reference signal, and transmit configuration information of a supplementary reference signal resource collection to the positioning server. The configuration information includes the configuration information of the supplementary reference signal resource collection.

That is to say, in the muting configuration period, if the transmitting node is configured with another reference signal set which may satisfy the positioning requirement and is close to a muted PRS period, the transmitting node transmits information about the reference signal set to the positioning server as a supplementary reference signal resource collection.

In the embodiment, the supplementary reference signal includes reference signals having a quasi-colocation relationship with the PRS.

In the embodiment, the supplementary reference signal is a periodical signal set and has a period in an integer multiple relation to that of the PRS.

In the embodiment, the configuration information of the supplementary reference signal resource collection includes a supplementary resource indication sequence configured to indicate whether the supplementary reference signal is transmitted in a corresponding period, and a time offset relative to a PRS resource collection.

The combination of the supplementary resource indication sequence and the time offset relative to the PRS resource collection is configured to indicate positions of the supplementary reference signal in one muting configuration period.

In the embodiment, the configuration information of the supplementary reference signal resource collection includes the following parameters of the supplementary reference signal: a bandwidth, a period, frequency domain density, a time-domain starting point, a resource collection ID and a muting sequence of supplementary reference signal.

In the embodiment, the configuration information of the supplementary reference signal resource collection may further include a scrambling code ID.

It should be noted that the supplementary reference signal is used to supplement the PRS in the above two ways, and an initialized pseudorandom sequence of the PRS may also be generated by the following formula:

$$c_{init} = 2^{29}\left\lfloor \frac{n_{ID}}{2^{10}} \right\rfloor + 2^{10}((N_{symb}^{slot} n_{s,f}^{u} + l) \bmod 2^8 + 1)(2(n_{ID} \bmod 2^{10}) + 1) + n_{ID} \bmod 2^{10}$$

where $n_{ID}$ is a scrambling code ID, $n_{s,f}^{u}$ refers to a slot number in a wireless frame, and $N_{symbol}^{slot}$ refers to the number of symbols in one slot.

At the step 202, the transmitting node transmits the reference signal according to the configuration information.

The transmitting node transmits the reference signal in the corresponding time domain and frequency domain positions according to the configuration information of the reference signal.

By using the existing reference signal reasonably, the embodiments of the present disclosure can achieve a balance between the resource overhead and the positioning effect, and enhance the positioning effect.

Figure 4:
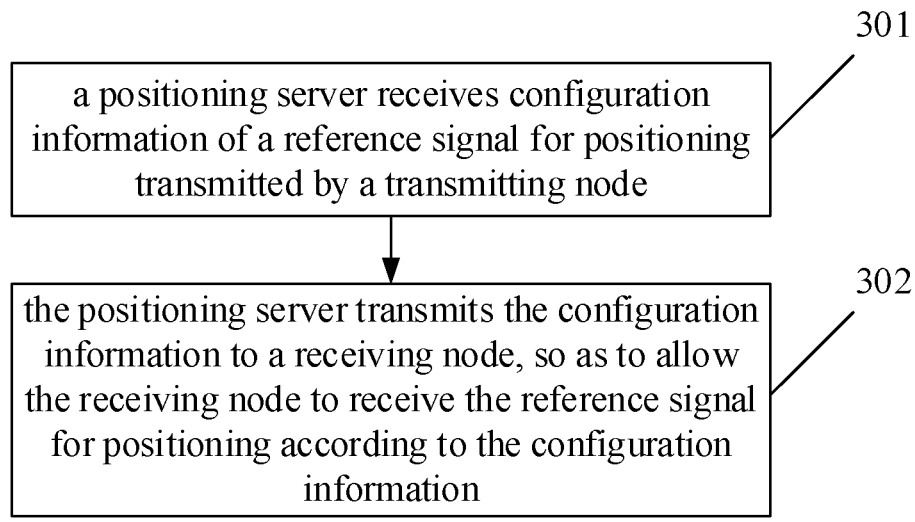
FIG. 4 is a flowchart illustrating an information transmission method applied to a positioning server according to an embodiment of the present disclosure.

As shown in FIG. 4, according to an embodiment of the present disclosure, an information transmission method applied to a positioning server includes steps 301 and 302.

At the step 301, a positioning server receives configuration information of a reference signal for positioning transmitted by a transmitting node.

The reference signal for positioning at least includes a PRS.

In the embodiment, the configuration information of the reference signal for positioning includes configuration information of the PRS.

In the embodiment, the configuration information of the PRS includes a PRS resource selection sequence configured to indicate whether a resource block in a resource collection is used to transmit a PRS.

In the embodiment, the configuration information of the PRS includes a muting sequence of PRS resource collections configured to indicate whether a PRS is transmitted in a corresponding PRS period.

In the embodiment, an initialized pseudorandom sequence of the PRS is generated by the following formula:

$$c_{init} = 2^{29}\left\lfloor \frac{n_{ID}}{2^{10}} \right\rfloor + 2^{10}((N_{symb}^{slot} n_{s,f}^{u} + l) \bmod 2^8 + 1)(2(n_{ID} \bmod 2^{10}) + 1) + n_{ID} \bmod 2^{10}$$

where $n_{ID}$ is a scrambling code ID, $n_{s,f}^{u}$ refers to a slot number in a wireless frame, and $N_{symbol}^{slot}$ refers to the number of symbols in one slot.

The reference signal for positioning further includes a supplementary reference signal.

In the embodiment, the supplementary reference signal includes a reference signal satisfying a positioning requirement in range of a PRS resource collection except for the PRS, and the configuration information includes configuration information of a supplementary reference signal resource.

In the embodiment, the supplementary reference signal includes a reference signal set, which satisfies a positioning requirement and a time difference between which and a muted PRS period is smaller than a preset threshold, in a muting configuration period, and the configuration information includes configuration information of a supplementary reference signal resource collection.

At the step 302, the positioning server transmits the configuration information to a receiving node, so as to allow the receiving node to receive the reference signal for positioning according to the configuration information.

The receiving node may be a UE.

In an initial stage of the positioning process, the positioning server may transmit the PRS resource selection sequence, the muting sequence of PRS resource collections and the configuration information of the supplementary reference signal to the receiving node as auxiliary information.

The positioning server may determine a reference cell and a neighboring cell of the receiving node, and transmit both configuration information of a reference signal for positioning in the reference cell and configuration information of a reference signal for positioning in the neighboring cell to the receiving node.

Figure 5:
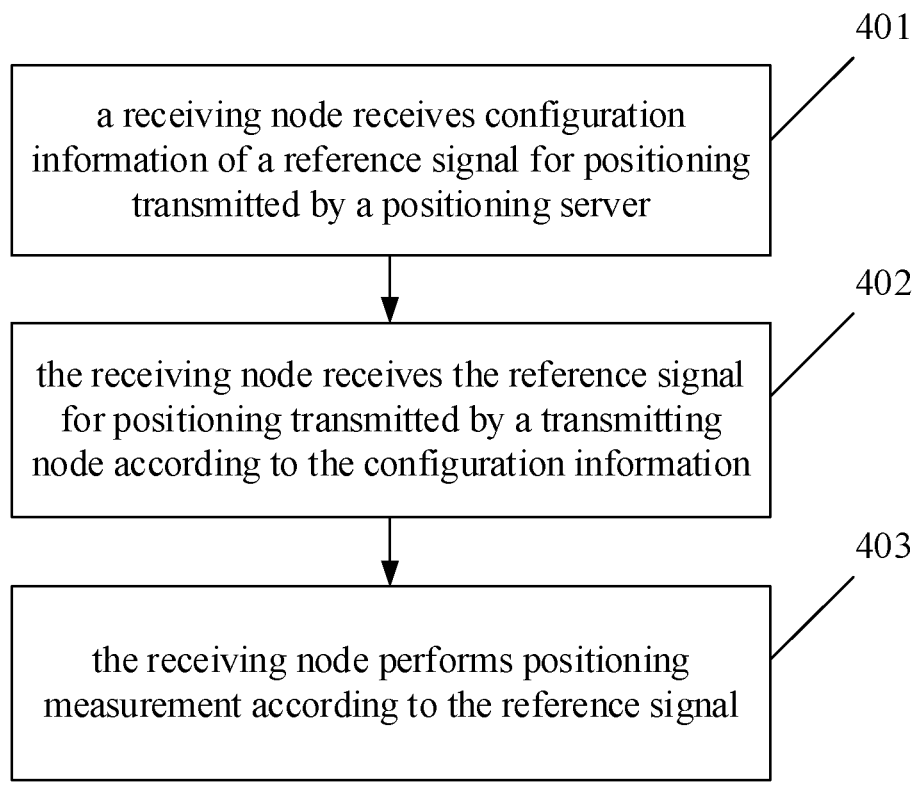
FIG. 5 is a flowchart illustrating an information transmission method applied to a receiving node according to an embodiment of the present disclosure.

As shown in FIG. 5, according to an embodiment of the present disclosure, an information transmission method applied to a receiving node includes steps 401 to 403.

At the step 401, a receiving node receives configuration information of a reference signal for positioning transmitted by a positioning server.

The receiving node may be a UE.

The reference signal for positioning at least includes a PRS.

In the embodiment, the configuration information of the reference signal for positioning includes configuration information of the PRS.

In the embodiment, the configuration information of the PRS includes a PRS resource selection sequence configured to indicate whether a resource block in a resource collection is used to transmit a PRS.

In the embodiment, the configuration information of the PRS includes a muting sequence of PRS resource collections configured to indicate whether a PRS is transmitted in a corresponding PRS period.

In the embodiment, an initialized pseudorandom sequence of the PRS is generated by the following formula:

$$c_{init} = 2^{29}\left\lfloor\frac{n_{ID}}{2^{10}}\right\rfloor + 2^{10}((N_{symb}^{slot}n_{s,f}^{u}+l) \bmod 2^8 + 1)(2(n_{ID} \bmod 2^{10})+1) + n_{ID} \bmod 2^{10}$$

where $n_{ID}$ is a scrambling code ID, $n_{s,f}^{\mu}$ refers to a slot number in a wireless frame, and $N_{symbol}^{slot}$ refers to the number of symbols in one slot.

The reference signal for positioning further includes a supplementary reference signal.

In the embodiment, the supplementary reference signal includes a reference signal satisfying a positioning requirement in range of a PRS resource collection except for the PRS, and the configuration information includes configuration information of a supplementary reference signal resource.

In the embodiment, the supplementary reference signal includes a reference signal set, which satisfies a positioning requirement and a time difference between which and a muted PRS period is smaller than a preset threshold, in a muting configuration period, and the configuration information includes configuration information of a supplementary reference signal resource collection.

At the step 402, the receiving node receives the reference signal for positioning transmitted by a transmitting node according to the configuration information.

The receiving node sets a corresponding detection time window and a corresponding detection period according to the configuration information, to detect the reference signal.

The receiving node determines positions of the PRS resources according to the PRS resource selection sequence, determines positions of muted time/frequency resources according to the muting sequence of PRS resource collections, and detects and receives the PRS in a position of a PRS resource which is not muted.

The receiving node determines the position of the supplementary reference signal according to the configuration information of the supplementary reference signal resource, so as to detect and acquire the supplementary reference signal.

For example, a quasi-colocation relationship of the PRS is determined according to the configuration information of the supplementary reference signal resource, and a position of the supplementary reference signal is determined according to the quasi-colocation relationship and the position of the PRS resource, so that the supplementary reference signal may be detected and acquired.

As another example, detection is performed according to the configuration information of the supplementary reference signal resource collection in a position closest to a muted PRS period (i.e., a position with a time difference smaller than the preset threshold), so as to acquire the supplementary reference signal.

At the step 403, the receiving node performs positioning measurement according to the reference signal.

The receiving node may perform positioning measurement according to the received PRS, or according to the PRS and the supplementary reference signal which are received. In the positioning measurement, the OTDOA may be used for positioning.

Some application examples are given below for illustration.

Application Example One

Figure 6:
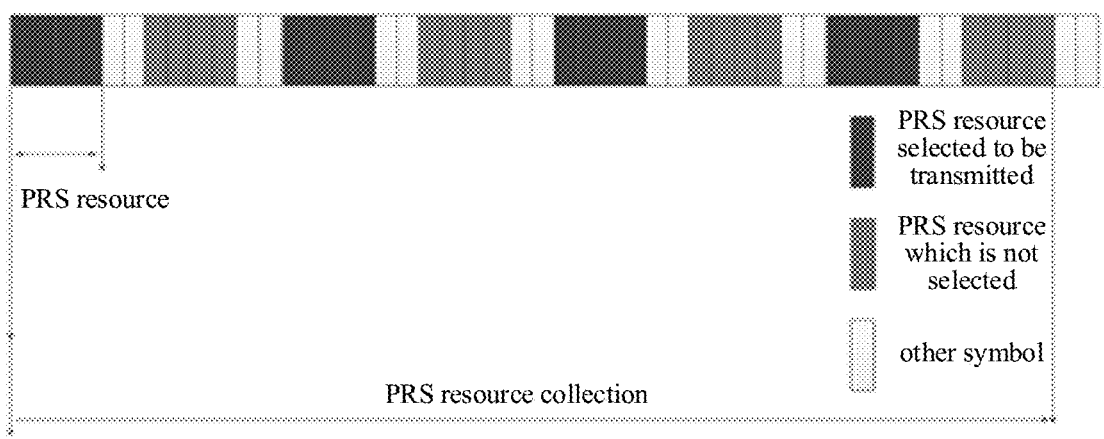
FIG. 6 is a schematic diagram of a PRS resource selection sequence according to an application example of the present disclosure.

As shown in FIG. 6, there are $i_{prs}^{max}$ PRS resources in one PRS resource collection, $i_{prs}^{max}$ is 8 in this application example, index numbers of the 8 PRS resources are from 0 to 7, and only the $0^{th}$, the $2^{nd}$, the $4^{th}$ and the $6^{th}$ PRS resources are selected to transmit by a transmitting node, thus a PRS resource selection sequence is 10101010.

The transmitting node reports the PRS resource selection sequence as configuration information of the PRS to a positioning server, and the configuration information of the PRS further includes sequence generation IDs of the 4 PRS resources, time-domain starting points, frequency domain density and muting configuration of PRS resource collections.

The positioning server transmits the configuration information of the PRS of the transmitting node which may be measured to a receiving node, and the receiving node configures corresponding detection time windows and detection periods to detect PRSs in a reference cell and a neighboring cell.

The OTDOA is adopted for performing positioning.

Application Example Two

Figure 7:
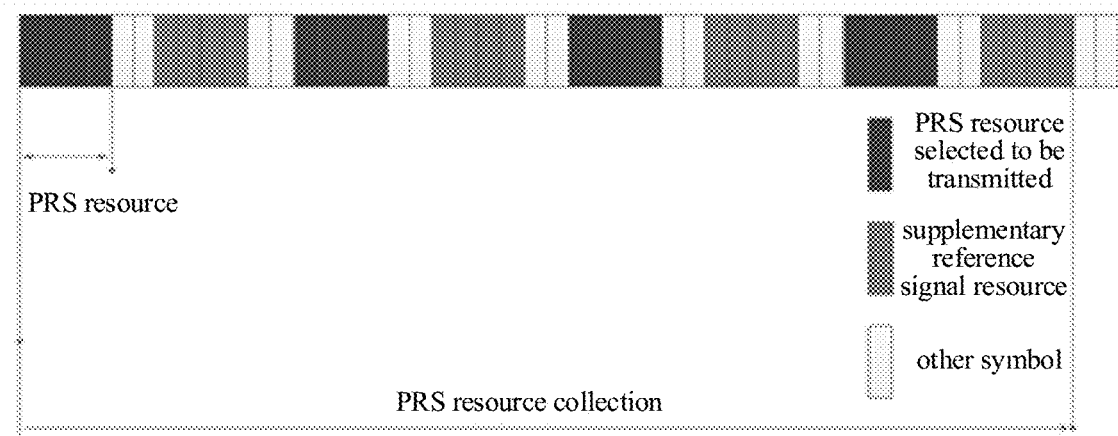
FIG. 7 is a schematic diagram of a case where supplementary reference signal resource are present according to an application example of the present disclosure.

The scenes in this application example are the same as those in the Application Example One, except that the coverage and signal strength provided by the 4 PRS resource collections are not capable of meeting a higher positioning accuracy requirement, the transmitting node also transmits other reference signal in potential resource positions which are not selected for PRS transmission, and the configuration of the other reference signal may be used for positioning measurement. Thus, the other reference signal is taken as the supplementary reference signal, as shown in FIG. 7.

Figure 8:
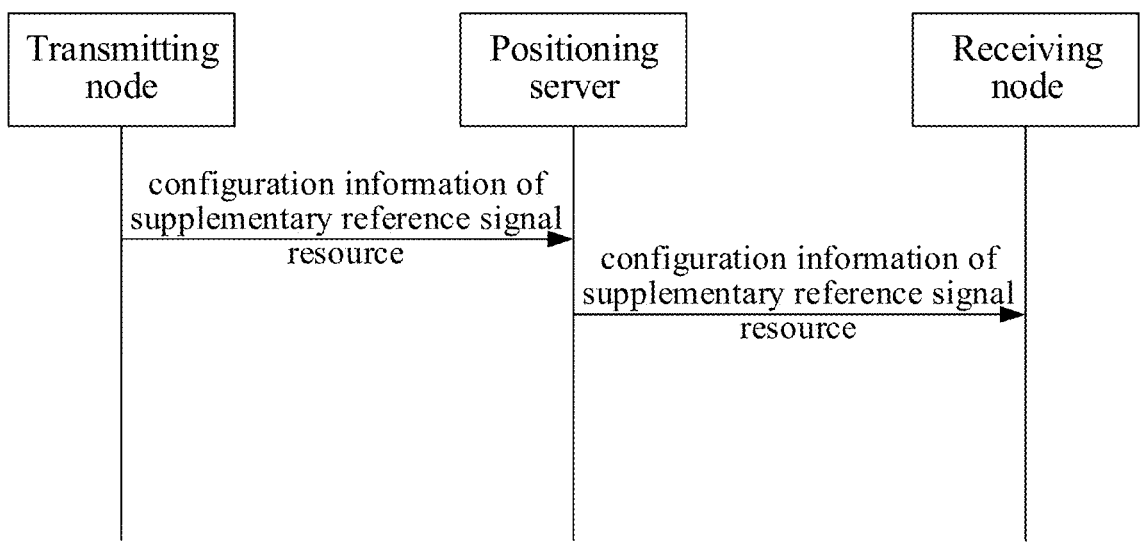
FIG. 8 is a flowchart of transmission of configuration information of a supplementary reference signal resource according to an application example of the present disclosure.

The transmitting node reports configuration information of the supplementary reference signal resource together with the configuration information of the PRS to the positioning server. The positioning server transmits the configuration information to the receiving node, and the receiving node determines a detection time window, a detection period and a local sequence for detection according to the configuration information, and detects the PRS and the supplementary reference signal for positioning. FIG. 8 shows a flowchart of transmission of the configuration information of the supplementary reference signal resource.

Application Example Three

Figure 9:
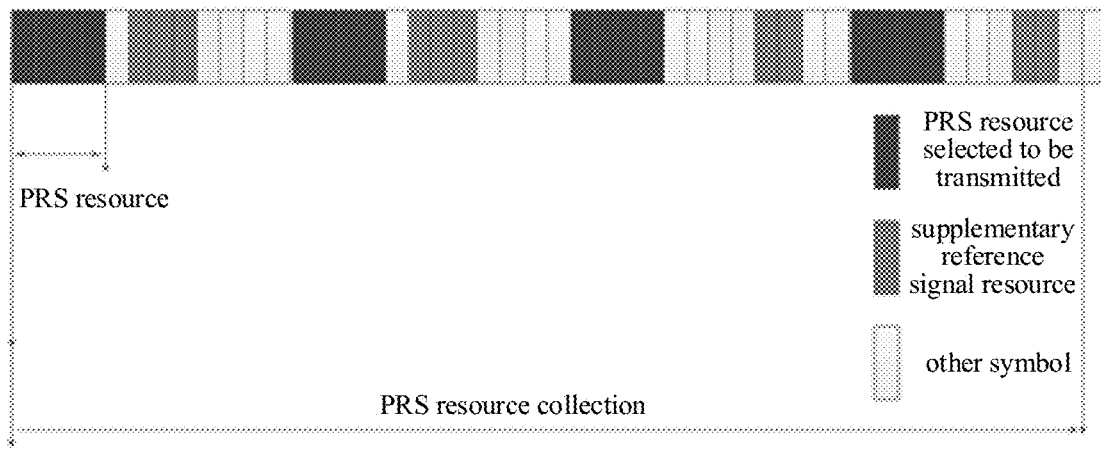
FIG. 9 is a schematic diagram of supplementary reference signal resource according to an application example of the present disclosure.

The scenes in this application example are the same as those in the Application Example Two, except that the transmitting node transmits other reference signal in other positions in addition to transmitting the PRS resources, and the resources of the other reference signal do not completely overlap with the available PRS resources, as shown in FIG. 9. The configuration of the resources of the other reference signal may be used for positioning measurement, so that the other reference signal is taken as the supplementary reference signal.

Figure 10:
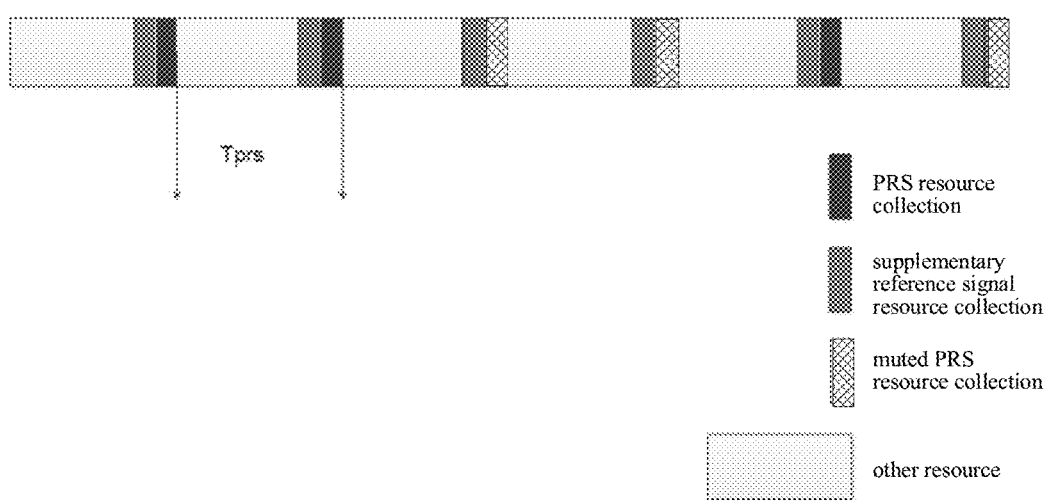
FIG. 10 is a schematic diagram of PRS resource collections and supplementary reference signal resource collections according to an application example of the present disclosure.

Application Example Four $T_{prs}$ is a transmission period of a PRS resource collection, and a PRS muting configuration period is six PRS transmission periods. Assuming that three PRS resource collections are muted, a PRS resource collection muting configuration sequence of the transmitting node is 110010. Since the PRS transmitted by the transmitting node in the 3rd, the 4th and the 6th PRS transmission periods are muted, the positioning based on the signal transmitted by the transmitting node in those three periods may be affected. Meanwhile, the transmitting node is configured with other reference signal resource collections, which may meet the positioning requirement, and have the same period as the PRS resource collections with a difference $t_{offset}$ relative to the PRS resource collections in terms of time domain, thus an indication sequence of supplementary reference signal resource collections is 111111, as shown in FIG. 10.

Figure 11:
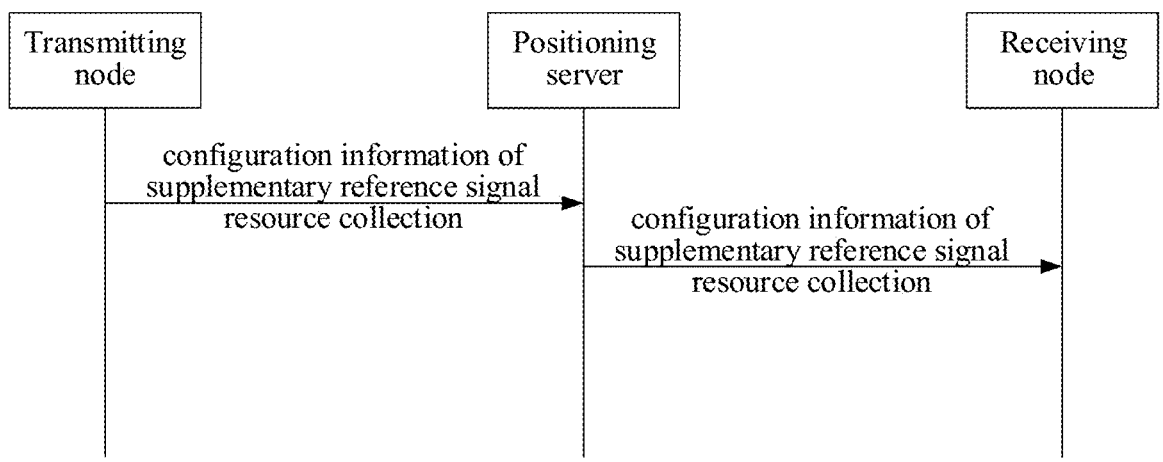
FIG. 11 is a flowchart of transmission of configuration information of a supplementary reference signal resource collection according to an application example of the present disclosure.

The transmitting node transmits the configuration information of the supplementary reference signal resource collections and the configuration information of the PRS to the positioning server, and the positioning server transmits the information to the receiving node. The receiving node configures a detection time window and a detection period according to the information for detecting the supplementary reference signal in the periods in which the PRS is muted to achieve positioning. The detection time window configured by the receiving node is capable of covering the supplementary reference signal resource collections and the PRS resource collections, and performs positioning according to differences between arrival time of the supplementary reference signal and the PRS signal from the transmitting nodes. FIG. 11 shows a flowchart of transmission of the configuration information of the supplementary reference signal resource collections.

Application Example Five

Figure 12:
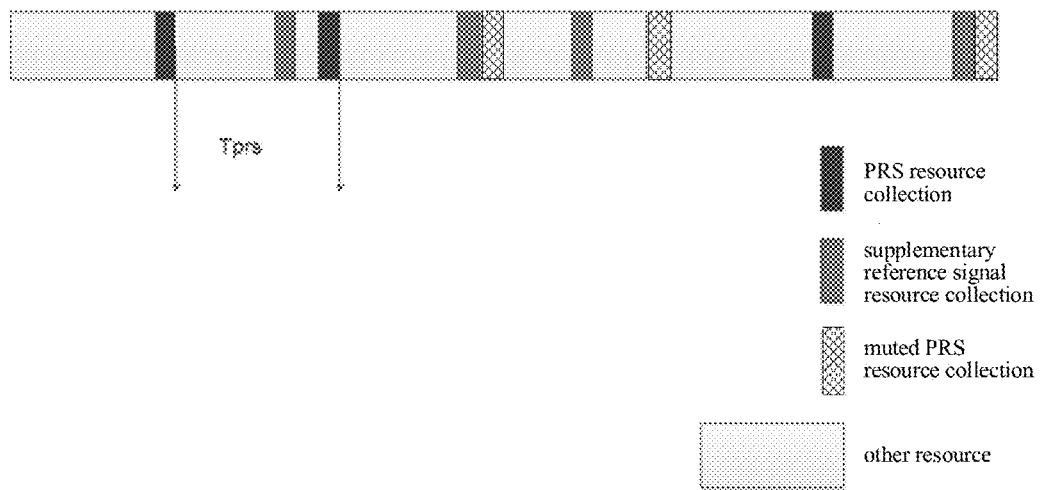
FIG. 12 is a schematic diagram of aperiodic supplementary reference signal resource collections according to an application example of the present disclosure.

The conditions in this application example are the same as those in the Application Example Four, except that the supplementary reference signal resource collections are not periodic as shown in FIG. 12, and the configuration information of the supplementary reference signal resource collections does not include the indication sequence of the supplementary reference signal resource collections.

The transmitting node transmits the configuration information of the supplementary reference signal resource collections and the configuration information of the PRS to the positioning server, and the positioning server transmits the information to the receiving node. The receiving node configures a detection time window and a detection period according to the information for detecting the supplementary reference signal in the periods in which the PRS is muted to achieve positioning. The detection time window configured by the receiving node is capable of covering the supplementary reference signal resource collections and the PRS resource collections, and performs positioning according to differences between arrival time of the supplementary reference signal and the PRS signal from the transmitting nodes.

Figure 13:
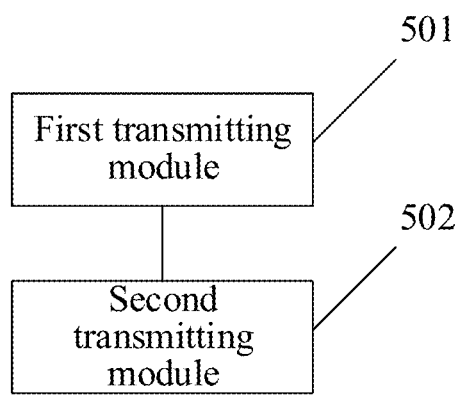
FIG. 13 is a schematic diagram of an information transmission device applied to a transmitting node according to an embodiment of the present disclosure.

As shown in FIG. 13, an embodiment of the present disclosure further provides an information transmission device applied to a transmitting node, including a first transmitting module 501 and a second transmitting module 502.

The first transmitting module 501 is configured to determine a reference signal for positioning and transmit configuration information of the reference signal for positioning to a positioning server. The reference signal for positioning at least includes a PRS.

The second transmitting module 502 is configured to transmit the reference signal according to the configuration information.

In the embodiment, the configuration information of the PRS includes a PRS resource selection sequence configured to indicate whether a resource block in a resource collection is used to transmit a PRS.

In the embodiment, the configuration information of the PRS includes a muting sequence of PRS resource collections configured to indicate whether a PRS is transmitted in a corresponding PRS period.

In the embodiment, an initialized pseudorandom sequence of the PRS is generated by the following formula:

$$c_{init} = 2^{29}\left\lfloor\frac{n_{ID}}{2^{10}}\right\rfloor + 2^{10}((N_{symb}^{slot}n_{s,f}^{\mu} + l)\bmod 2^8 + 1)(2(n_{ID}\bmod 2^{10}) + 1) + n_{ID}\bmod 2^{10}$$

where $n_{ID}$ is a scrambling code ID, $n_{s,f}^{\mu}$ refers to a slot number in a wireless frame, and $N_{symb}^{slot}$ refers to the number of symbols in one slot.

In the embodiment, the reference signal for positioning further includes a supplementary reference signal.

In the embodiment, the configuration information includes configuration information of a supplementary reference signal resource, and the first transmitting module 501 is configured to use a reference signal satisfying a positioning requirement in range of a PRS resource collection except for the PRS as the supplementary reference signal, determine a supplementary reference signal resource occupied by the supplementary reference signal, and transmit the configuration information of the supplementary reference signal resource to the positioning server.

In the embodiment, the supplementary reference signal resource is periodically present in a muting configuration period and is present in each PRS resource period.

In the embodiment, the supplementary reference signal includes a reference signal having a quasi-colocation relationship with the PRS.

In the embodiment, the configuration information of the supplementary reference signal resource includes the quasi-colocation relationship.

In the embodiment, the configuration information of the supplementary reference signal resource includes the following parameters of the supplementary reference signal: a bandwidth, frequency domain density, a time-domain starting point, time domain density, a period and a resource ID.

In the embodiment, the configuration information includes configuration information of a supplementary reference signal resource collection, and the first transmitting module 501 is configured to use a reference signal set, which satisfies a positioning requirement and a time difference between which and a muted PRS period is smaller than a preset threshold, in a muting configuration period as the supplementary reference signal, and transmit configuration information of a supplementary reference signal resource collection to the positioning server.

In the embodiment, the supplementary reference signal includes reference signals having a quasi-colocation relationship with the PRS.

In the embodiment, the supplementary reference signal is a periodical signal set and has a period in an integer multiple relation to that of the PRS.

In the embodiment, the configuration information of the supplementary reference signal resource collection includes a supplementary resource indication sequence configured to indicate whether the supplementary reference signal is transmitted in a corresponding period, and a time offset relative to a PRS resource collection.

In the embodiment, the configuration information of the supplementary reference signal resource collection includes the following parameters of the supplementary reference signal: a bandwidth, a period, frequency domain density, a time-domain starting point, a resource collection ID and a muting sequence of supplementary reference signal.

Figure 14:
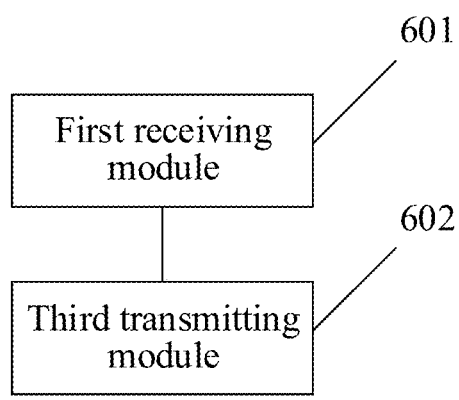
FIG. 14 is a schematic diagram of an information transmission device applied to a positioning server according to an embodiment of the present disclosure.

As shown in FIG. 14, an embodiment of the present disclosure further provides an information transmission device applied to a positioning server, including a first receiving module 601 and a third transmitting module 602.

The first receiving module 601 is configured to receive configuration information of a reference signal for positioning transmitted by a transmitting node.

The third transmitting module 602 is configured to transmit the configuration information to a receiving node, so as to allow the receiving node to receive the reference signal for positioning according to the configuration information.

The reference signal for positioning at least includes a PRS.

In the embodiment, the reference signal for positioning further includes a supplementary reference signal.

In the embodiment, the supplementary reference signal includes a reference signal satisfying a positioning requirement in range of a PRS resource collection except for the PRS, and the configuration information includes configuration information of a supplementary reference signal resource.

In the embodiment, the supplementary reference signal includes a reference signal set, which satisfies a positioning requirement and a time difference between which and a muted PRS period is smaller than a preset threshold, in a muting configuration period, and the configuration information includes configuration information of a supplementary reference signal resource collection.

Figure 15:
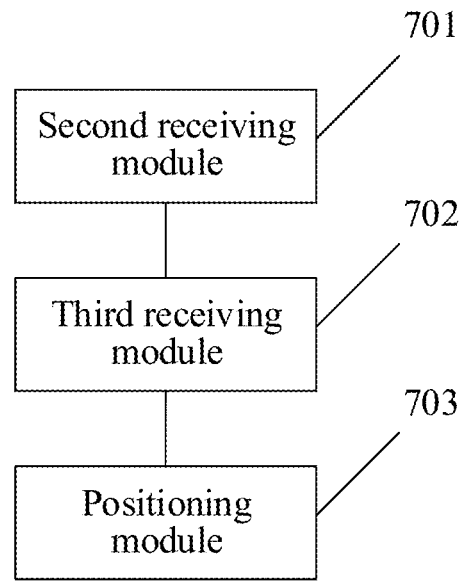
FIG. 15 is a schematic diagram of an information transmission device applied to a receiving node according to an embodiment of the present disclosure.

As shown in FIG. 15, an embodiment of the present disclosure further provides an information transmission device applied to a receiving node, including a second receiving module 701, a third receiving module 702 and a positioning module 703.

The second receiving module 701 is configured to receive configuration information of a reference signal for positioning transmitted by a positioning server.

The third receiving module 702 is configured to receive the reference signal for positioning transmitted by a transmitting node according to the configuration information.

The positioning module 703 is configured to perform positioning measurement according to the reference signal.

The reference signal for positioning at least includes a PRS.

Figure 16:
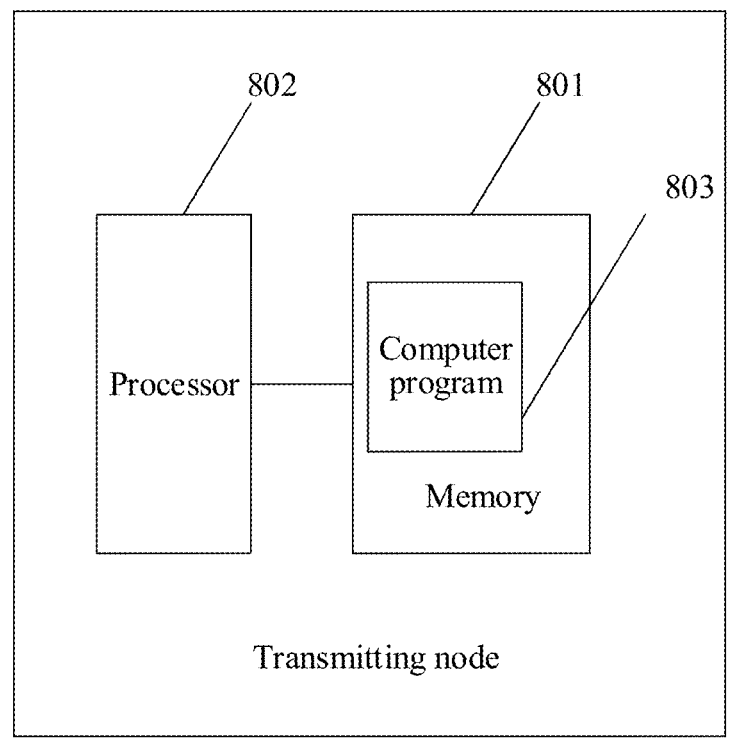
FIG. 16 is a schematic diagram of a transmitting node according to an embodiment of the present disclosure.

As shown in FIG. 16, an embodiment of the present disclosure further provides a transmitting node, including: a memory 801, a processor 802 and a computer program 803 which is stored in the memory 801 and is executable by the processor 802. The processor 802 performs the information transmission method illustrated by FIG. 3 when executing the computer program 803.

Figure 17:
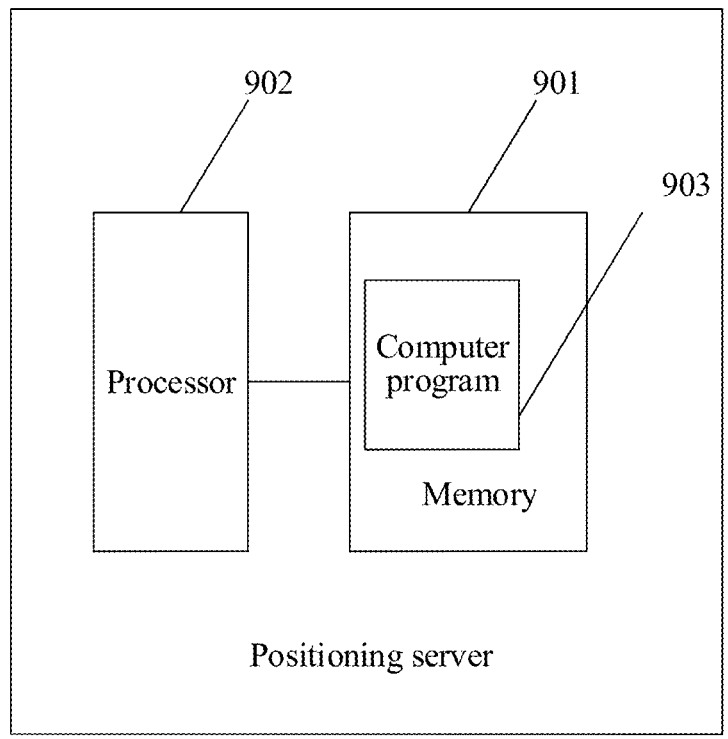
FIG. 17 is a schematic diagram of a positioning server according to an embodiment of the present disclosure.

As shown in FIG. 17, an embodiment of the present disclosure further provides a positioning server, including: a memory 901, a processor 902 and a computer program 903 which is stored in the memory 901 and is executable by the processor 902. The processor 902 performs the information transmission method illustrated by FIG. 4 when executing the computer program 903.

Figure 18:
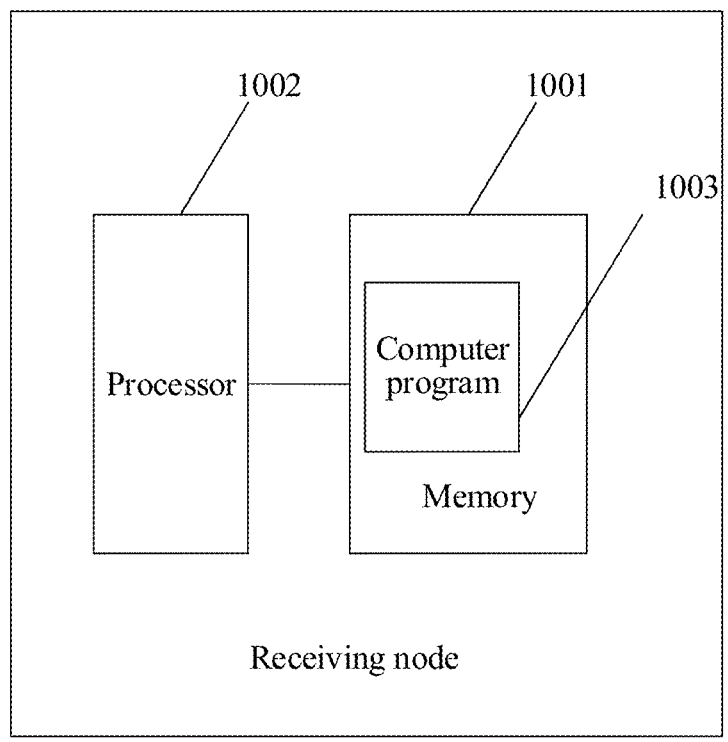
FIG. 18 is a schematic diagram of a receiving node according to an embodiment of the present disclosure.

As shown in FIG. 18, an embodiment of the present disclosure further provides a receiving node, including: a memory 1001, a processor 1002 and a computer program 1003 which is stored in the memory 1001 and is executable by the processor 1002. The processor 1002 performs the information transmission method illustrated by FIG. 5 when executing the computer program 1003.

An embodiment of the present disclosure further provides a computer-readable storage medium having a computer-executable instruction stored therein. When the computer-executable instruction is executed by a processor, the processor performs the information transmission method according to each embodiment of the present disclosure.

In the embodiment, the storage medium may include, but is not limited to, a Universal Serial Bus flash disk (USB flash disk), a Read-Only Memory (ROM), a Random Access Memory (RAM), a mobile hard disk, a magnetic disk, an optical disc, and any other medium capable of storing program code.

It should be understood by those of ordinary skill in the art that the functional modules/units in all or some of the steps, the systems and the devices in the methods disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or step may be performed through cooperation of several physical components. Some or all of the components may be implemented as software executed by a processor, such as a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, an RAM, an ROM, an Electrically Erasable Programmable Read-Only Memory (EEPROM), a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer.

What is claimed is:

1. An information transmission method, comprising:
    determining, by a transmitting node, a reference signal for positioning and transmitting configuration information of the reference signal for positioning to a positioning server, wherein the reference signal for positioning at least comprises a Positioning Reference Signal (PRS); and
    transmitting, by the transmitting node, the reference signal according to the configuration information,
    wherein the reference signal for positioning further comprises a supplementary reference signal, and
    wherein the configuration information comprises configuration information of the supplementary reference signal resource collection, and the step of determining, by the transmitting node, the reference signal for positioning and transmitting the configuration information of the reference signal for positioning to the positioning server comprises:
using, by the transmitting node, in a muting configuration period, a reference signal set, which satisfies a positioning requirement and a time difference between which and a muted PRS period is smaller than a preset threshold, as the supplementary reference signal; and
transmitting, by the transmitting node, configuration information of a supplementary reference signal resource collection to the positioning server.

2. The method of claim 1, wherein the configuration information of the PRS comprises a PRS resource selection sequence configured to indicate whether a resource block in a resource collection is used to transmit a PRS.

3. The method of claim 1, wherein the configuration information of the PRS comprises a muting sequence of PRS resource collections configured to indicate whether a PRS is transmitted in a corresponding PRS period.

4. The method of claim 1, wherein an initialized pseudo-random sequence of the PRS is generated by the following formula:

$$c_{init} = 2^{29} \left\lfloor \frac{n_{ID}}{2^{10}} \right\rfloor + 2^{10}((N_{symb}^{slot} n_{s,f}^{u} + l) \bmod 2^{8} + 1)(2(n_{ID} \bmod 2^{10}) + 1) + n_{ID} \bmod 2^{10}$$

where $n^{ID}$ is a scrambling code ID, $n^{\mu}_{s,f}$ refers to a slot number in a wireless frame, and $N^{slot}_{symb}$ refers to the number of symbols in one slot.

5. The method of claim 1, wherein the configuration information further comprises configuration information of a supplementary reference signal resource, and the step of determining, by the transmitting node, the reference signal for positioning and transmitting the configuration information of the reference signal for positioning to the positioning server comprises:
using, by the transmitting node, a reference signal satisfying a positioning requirement in range of a PRS resource collection except for the PRS as the supplementary reference signal;
determining, by the transmitting node, the supplementary reference signal resource occupied by the supplementary reference signal; and
transmitting, by the transmitting node, configuration information of the supplementary reference signal resource to the positioning server.

6. The method of claim 5, wherein the supplementary reference signal resource is periodically present in a muting configuration period and is present in each PRS resource period.

7. The method of claim 5, wherein the supplementary reference signal comprises a reference signal having a quasi-colocation relationship with the PRS, and the configuration information of the supplementary reference signal resource comprises the quasi-colocation relationship.

8. The method of claim 1, wherein the supplementary reference signal comprises reference signals having a quasi-colocation relationship with the PRS.

9. The method of claim 1, wherein the supplementary reference signal is a periodical signal set and has a period in an integer multiple relation to that the PRS.

10. The method of claim 9, wherein the configuration information of the supplementary reference signal resource collection comprises a supplementary resource indication sequence configured to indicate whether the supplementary reference signal is transmitted in a corresponding period, and a time offset relative to a PRS resource collection.

11. A transmitting node, comprising: a memory, a processor and a computer program which is stored in the memory and is executable by the processor, wherein the processor performs the information transmission method of claim 1 when executing the computer program.

12. A computer-readable storage medium having a computer-executable instruction stored therein, wherein, when the computer-executable instruction is executed by a processor, the processor performs the information transmission method of claim 1.

13. An information transmission method, comprising:
receiving, by a positioning server, configuration information of a reference signal for positioning transmitted by a transmitting node; and
transmitting, by the positioning server, the configuration information to a receiving node, so as to allow the receiving node to receive the reference signal for positioning according to the configuration information,
wherein the reference signal for positioning at least comprises a PRS and a supplementary reference signal,
wherein the configuration information comprises configuration information of the supplementary reference signal resource collection,
wherein the supplementary reference signal is a reference signal set which satisfies a positioning requirement and a time difference between which and a muted PRS period is smaller than a preset threshold in a muting configuration period, and
wherein the step of receiving, by the positioning server, the configuration information of the reference signal for positioning transmitted by the transmitting node comprises:
receiving, by the positioning server, configuration information of a supplementary reference signal resource collection from the transmitting node.

14. A positioning server, comprising: a memory, a processor and a computer program which is stored in the memory and is executable by the processor, wherein the processor performs the information transmission method of claim 13 when executing the computer program.

15. A computer-readable storage medium having a computer-executable instruction stored therein, wherein, when the computer-executable instruction is executed by a processor, the processor performs the information transmission method of claim 13.

* * * * *